(12) United States Patent
Miyanaga

(10) Patent No.: US 7,611,312 B2
(45) Date of Patent: Nov. 3, 2009

(54) CORE CUTTER

(75) Inventor: Masaaki Miyanaga, Hyogo (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 0 days.

(21) Appl. No.: 10/558,125

(22) PCT Filed: May 28, 2004

(86) PCT No.: PCT/JP2004/007740

§ 371 (c)(1),
(2), (4) Date: Sep. 5, 2006

(87) PCT Pub. No.: WO2004/108333

PCT Pub. Date: Dec. 16, 2004

(65) Prior Publication Data

US 2007/0065244 A1 Mar. 22, 2007

(30) Foreign Application Priority Data

Jun. 5, 2003 (JP) .............................. 2003-160652
Oct. 20, 2003 (JP) .............................. 2003-358905

(51) Int. Cl.
*B23B 51/04* (2006.01)
(52) U.S. Cl. ....................................... 408/204; 408/206
(58) Field of Classification Search ................. 408/204, 408/206, 207, 703; *B23B 51/04, 51/05*
See application file for complete search history.

(56) References Cited

U.S. PATENT DOCUMENTS

| | | | | |
|---|---|---|---|---|
| 3,308,689 A | * | 3/1967 | MacDonald | 408/204 |
| 3,430,526 A | * | 3/1969 | Valenziano | 408/204 |
| 3,609,056 A | * | 9/1971 | Hougen | 408/204 |
| 3,765,789 A | | 10/1973 | Hougen | |
| 3,860,354 A | | 1/1975 | Hougen | |

(Continued)

FOREIGN PATENT DOCUMENTS

DE 3217699 A1 * 12/1982

(Continued)

OTHER PUBLICATIONS

International Search Report for International Patent Application No. PCT/JP2004/007740 by the Japanese Patent Office dated Jul. 1, 2004 (2 pages).

*Primary Examiner*—Daniel W Howell
(74) *Attorney, Agent, or Firm*—Marshall, Gerstein & Borun LLP

(57) ABSTRACT

A core cutter comprises a cylindrical base, a plurality of cutting portions provided at a tip end of the base, discharge grooves configured to discharge chips cut by the cutting portions, and an attaching portion. Each of the cutting portions 2 includes a block and at least three cutting blades. A first cutting blade 2*a* may be located radially inward relative to the second and third cutting blades 2*b* and 2*c* and the second cutting blade 2*c* is located between the first and third cutting blades in a radial direction, and the cutting blades deviate rearward in a rotational direction. A wall 3*b* of the discharge groove 3 corresponds to a cutting surface 2*k* of the third cutting blade, and a gallet 4 is provided adjacent each cutting portion, the gallet formed by cutting an outer peripheral surface of a tip end portion.

20 Claims, 12 Drawing Sheets

U.S. PATENT DOCUMENTS

| | | | | |
|---|---|---|---|---|
| 4,352,610 A | * | 10/1982 | Yankovoy et al. | 408/1 R |
| 4,408,935 A | * | 10/1983 | Miyanaga | 408/206 |
| 4,452,554 A | | 6/1984 | Hougen | |
| 4,538,944 A | * | 9/1985 | Hougen | 408/206 |
| 4,557,641 A | * | 12/1985 | Hougen | 408/204 |
| 4,632,610 A | * | 12/1986 | Hougen | 408/204 |
| 4,767,245 A | * | 8/1988 | Shoji et al. | 408/204 |
| 4,813,819 A | * | 3/1989 | Hougen | 408/1 R |
| 4,871,287 A | * | 10/1989 | Hougen | 408/204 |
| 4,952,102 A | * | 8/1990 | Hougen | 408/204 |
| 5,145,296 A | * | 9/1992 | Hougen | 408/1 R |
| 5,160,232 A | * | 11/1992 | Maier | 408/223 |
| 5,218,888 A | * | 6/1993 | Merrill | 76/108.1 |
| 5,281,060 A | * | 1/1994 | Strange et al. | 408/204 |
| 5,569,002 A | * | 10/1996 | Kleine | 408/204 |
| 5,988,956 A | * | 11/1999 | Omi et al. | 408/204 |
| 6,280,123 B1 | * | 8/2001 | Gill | 408/76 |
| 6,676,711 B2 | * | 1/2004 | Omi | 83/847 |
| D541,831 S | * | 5/2007 | Miyanaga | D15/139 |

FOREIGN PATENT DOCUMENTS

| | | | |
|---|---|---|---|
| GB | 2080711 A | * | 2/1982 |
| JP | 48-77488 | | 10/1973 |
| JP | 57-27608 | | 2/1982 |
| JP | 58-59712 | | 4/1983 |
| JP | 59134610 A | * | 8/1984 |
| JP | 60025609 A | * | 2/1985 |
| JP | 60048208 A | * | 3/1985 |
| JP | 61-163110 | | 10/1986 |
| JP | 05-154709 | | 6/1993 |
| JP | 11058116 A | * | 3/1999 |
| JP | 2001-138120 | | 5/2001 |
| JP | 2002-370115 | | 12/2002 |
| WO | WO 2006025230 A1 | * | 3/2006 |

\* cited by examiner

CORE CUTTER

The present application claims the benefit of priority of International Patent Application No. PCT/JP2004/007740 filed on May 28, 2004, which application claims priority of Japanese Patent Application Nos. 2003-160652 filed Jun. 5, 2003 and 2003-358905 filed Oct. 20, 2003. The entire text of the priority application is incorporated herein by reference in its entirety.

TECHNICAL FIELD

The present invention relates to a core cutter and, particularly to a core cutter optimized for drilling holes in materials such as metal, resin material, polymer material, stone, cement, and wood.

BACKGROUND ART

Traditionally, various core cutters of this type have been proposed. For example, core cutters are entirely formed of the same material, to be specific, high-speed steel. The core cutter formed of the same material is provided with a spiral groove on a cylindrical outer peripheral surface thereof. Through the spiral groove, chips resulting from cutting operation are discharged. A portion of the core cutter except the spiral groove is a substantial thickness of a base of the core cutter.

In the core cutter for drilling holes in metal, resin material and other materials, since the chips being generated continuously have a large width, it is desirable to minimize the width of the chips in order to discharge the chips efficiently outside the holes.

To this end, each cutting portion at a tip end portion of the core cutter is provided with a plurality of cutting blades defining a width of the chips, and is configured to discharge the chips with a width equal to the width of the cutting blades of each cutting portion. For example, each cutting portion has a first cutting blade located radially inward and a second cutting blade located radially outward.

In the core cutter thus constructed, the first cutting blade is formed radially inward relative to the discharge groove and the second cutting blade is formed radially outward relative to the discharge groove.

In a core cutter of another configuration, each cutting portion has first to third cutting blades in this order from radially inward. In the core cutter thus constructed, each cutting blade has a gallet for discharging the chips which is formed by a step portion. And, the chips cut by each cutting blade of each cutting portion are discharged through each gallet to outside from a discharge groove continuous with a base end side of each gallet (see Japanese Laid-Open Patent Application Publication 58-59712).

However, in the former cutter, the thickness (radial wall thickness) of the base is determined by a radial thickness of the first cutting blade (or first and second cutting blades) of the cutting portion. Therefore, in the cutter thus constructed, the wall thickness (thickness) of the base decreases depending on the structure of the cutting portion (thickness of the cutting portion), and rigidity of the base becomes lower than a desired value. In this case, the cutter is unable to conduct heavy cutting or cut the material with high cutting resistance.

In the latter core cutter, since the cutting blades are provided with different gallets, time and complicated process are required to form the gallets with intricate configurations.

DISCLOSURE OF THE INVENTION

An object of the present invention is to provide a core cutter in which a thickness of a base does not vary depending on a radial wall thickness (thickness) of a cutting blade and gallets are formed easily.

A core cutter of a first invention comprises a cylindrical base; an attaching portion that is provided on a base end side of the base to be attachable to a rotation drive tool; a plurality of cutting portions provided at a tip end of the base to be spaced apart from each other in a circumferential direction of the base in such a manner that outer peripheries of the cutting portions protrude radially outward relative to an outer periphery of the base; and discharge grooves each of which is provided between adjacent cutting portions of the plurality of cutting portions and is configured to discharge chips cut by the cutting portions toward the base end of the base; wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base, wherein the first, second, and third cutting blades are arranged such that their circumferential positions deviate rearward in this order in a rotational direction of the core cutter; wherein a wall of a rear end of the discharge groove provided to correspond to the third cutting blade is located at the same position or rearward in the rotational direction relative to a cutting surface of the third cutting blade; and wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet.

A core cutter of a second invention comprises a cylindrical base; an attaching portion that is provided on a base end side of the base to be attachable to a rotation drive tool; a plurality of cutting portions provided at a tip end of the base to be spaced apart from each other in a circumferential direction of the base in such a manner that outer peripheries of the cutting portions protrude radially outward relative to an outer periphery of the base; and discharge grooves each of which is provided between adjacent cutting portions of the plurality of cutting portions and is configured to discharge chips cut by the cutting portions toward the base end of the base; wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base such that the second cutting blade is located rearward in the rotational direction relative to the first and third cutting blades in a circumferential direction of the base and the first and third cutting blades are located adjacent the second cutting blade and forward in the rotational direction relative to the second cutting blade in the circumferential direction; wherein a wall of a rear end of the discharge groove provided to correspond to the third cutting blade is located at the same position or rearward in the rotational direction relative to a cutting surface of the third cutting blade; and wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet.

A core cutter of a third invention comprises a cylindrical base; an attaching portion that is provided on a base end side of the base to be attachable to a rotation drive tool; a plurality of cutting portions provided at a tip end of the base to be spaced apart from each other in a circumferential direction of the base in such a manner that outer peripheries of the cutting portions protrude radially outward relative to an outer periphery of the base; and discharge grooves each of which is provided between adjacent cutting portions of the plurality of cutting portions and is configured to discharge chips cut by the cutting portions toward the base end of the base; wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base such that the second cutting blade is located forward in the rotational direction relative to the first and third cutting blades in a circumferential direction of the base and the first and third cutting blades are located rearward in the rotational direction relative to the second cutting blade in the circumferential direction; wherein a wall of a rear end of the discharge groove provided to correspond to the third cutting blade is located at the same position or rearward in the rotational direction relative to a cutting surface of the third cutting blade; and wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet.

A core cutter of a fourth invention comprises a cylindrical base; an attaching portion that is provided on a base end side of the base to be attachable to a rotation drive tool; a plurality of cutting portions provided at a tip end of the base to be spaced apart from each other in a circumferential direction of the base in such a manner that outer peripheries of the cutting portions protrude radially outward relative to an outer periphery of the base; and discharge grooves each of which is provided between adjacent cutting portions of the plurality of cutting portions and is configured to discharge chips cut by the cutting portions toward the base end of the base; wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base, wherein the third, second, and first cutting blades are arranged such that their circumferential positions deviate rearward in this order in a rotational direction of the core cutter; wherein a wall of a rear end of the discharge groove provided to correspond to the third cutting blade is located at the same position or rearward in the rotational direction relative to a cutting surface of the third cutting blade; and wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position an the outer end of the gallet.

In the core cutter constructed as described above, the radial wall thickness of the base can be determined to be adapted to desired rigidity without depending on the radial thickness of each cutting blade.

In addition, since each cutting portion is constructed of a single block, it can be easily fitted to a concave portion formed at a tip end portion of the base.

In the core cutter thus constructed, a gallet for discharging the chips may be formed adjacent each cutting portion and forward relative to each cutting portion in the rotational direction, namely, forward relative to the concave portion in the rotational direction, and may be formed by one surface. For this reason, the gallet can be formed easily regardless of the three or more cutting blades formed at each cutting portion.

In the core cutter of the second invention, a cutting surface of the second cutting blade may be bent at an upper end thereof radially outward of the core cutter. Thereby, the chips cut by the second cutting blade located rearward relative to the first and third cutting blades in the rotational direction are easily discharged toward the third cutting blade located radially outward relative to the first and second cutting blades.

In the core cutter of the second invention, a base end portion of a cutting surface of the second cutting blade may be located on a base end side of the third cutting blade, and the chips cut by the second cutting blade may be discharged from a position on the base end side of the third cutting blade radially outward of the core cutter. Thereby, the chips cut by the second cutting blade located rearward relative to the first and third cutting blades in the rotational direction are smoothly discharged from a position above the third cutting blade located radially outward to outside the core cutter.

In the core cutter of any one of the first to fourth inventions, an outer peripheral surface of the gallet may be tilted radially inward and downward at a tip end side of the base and may be formed to have a tip end substantially conforming to an inner end of the first cutting blade in the radial direction so as to form a curved surface. The gallet can be easily formed by grinding or broaching the base.

In the core cutter according to any one of the first to fourth inventions, a blade width of each of the first to third cutting blades is set independently of a thickness of the base. In such a construction, the radial wall thickness of the base and the radial thickness of each cutting blade are set to enable the base and the cutting blade to function efficiently.

In the core cutter according to any one of the first to fourth inventions, a tilting angle in the rotational direction of the wall of the rear end of the discharge groove provided on the base end side of the third cutting blade may be set independently of a cutting angle of a cutting surface of the third cutting blade. In other words, the cutting surface of the third cutting blade can be set without depending on the tilting angle in the rotational direction of the wall of the rear end of the discharge groove provided on the base end side of the third cutting blade. In such a construction, a cutting angle of the cutting surface can be set according to only cutting ability, and the tilting angle in the rotational direction of the wall of the rear end of the discharge groove can be set suitably according to only discharge ability of the chips.

In the core cutter according to any one of the first to fourth inventions, the plurality of cutting portions may be made of a cemented carbide material (cemented carbide alloy). Such a material provides high cutting ability to the core cutter.

BEST MODE FOR CARRYING OUT THE INVENTION

Hereinafter, embodiments of a core cutter of the present invention will be described with reference to the drawings.

Embodiment 1

Now, a core cutter according to an embodiment 1 of the present invention will be described with reference to the drawings.

Figure 1:
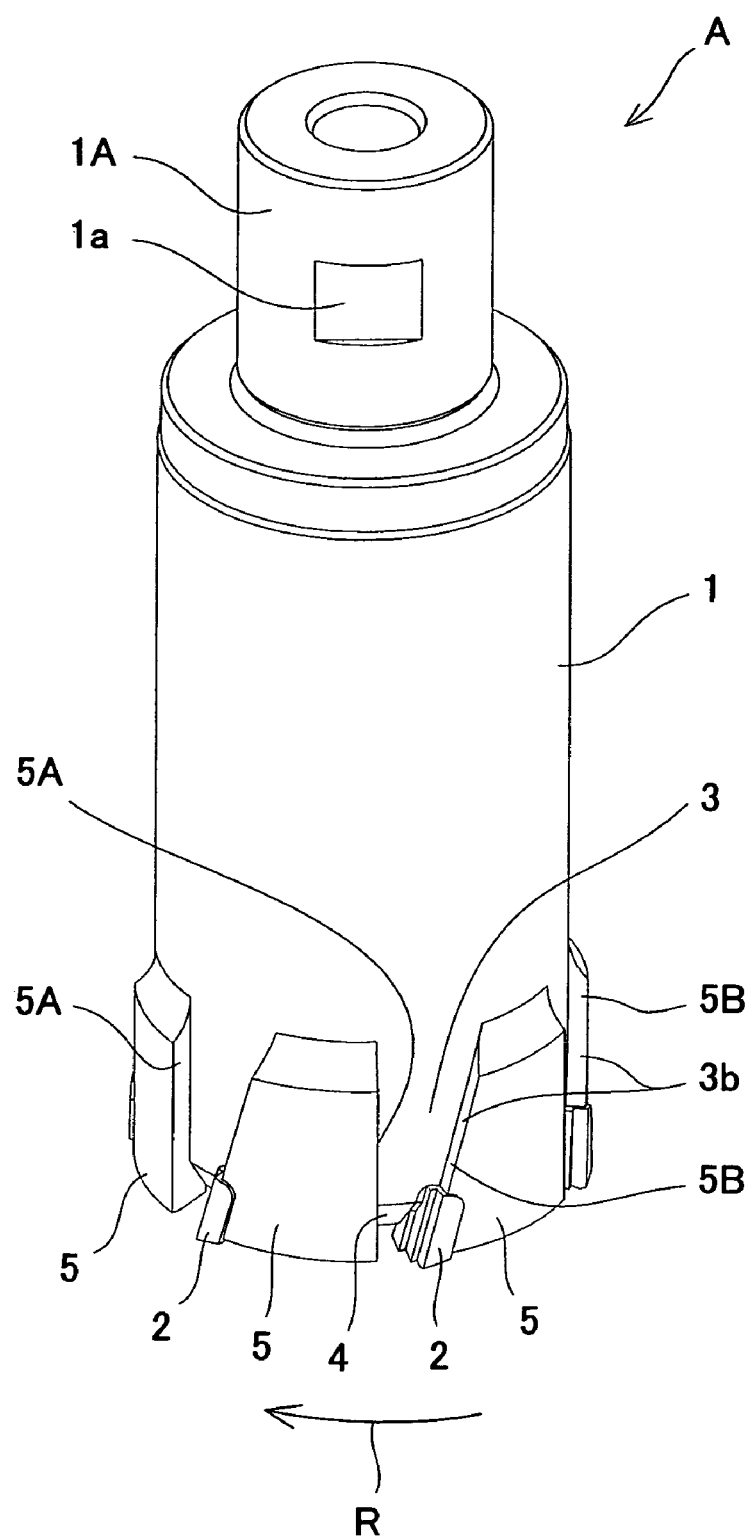
FIG. 1 is a perspective view showing a construction of an entire core cutter according to an embodiment of the present invention, as seen from obliquely rearward of a base end thereof.
Figure 2:
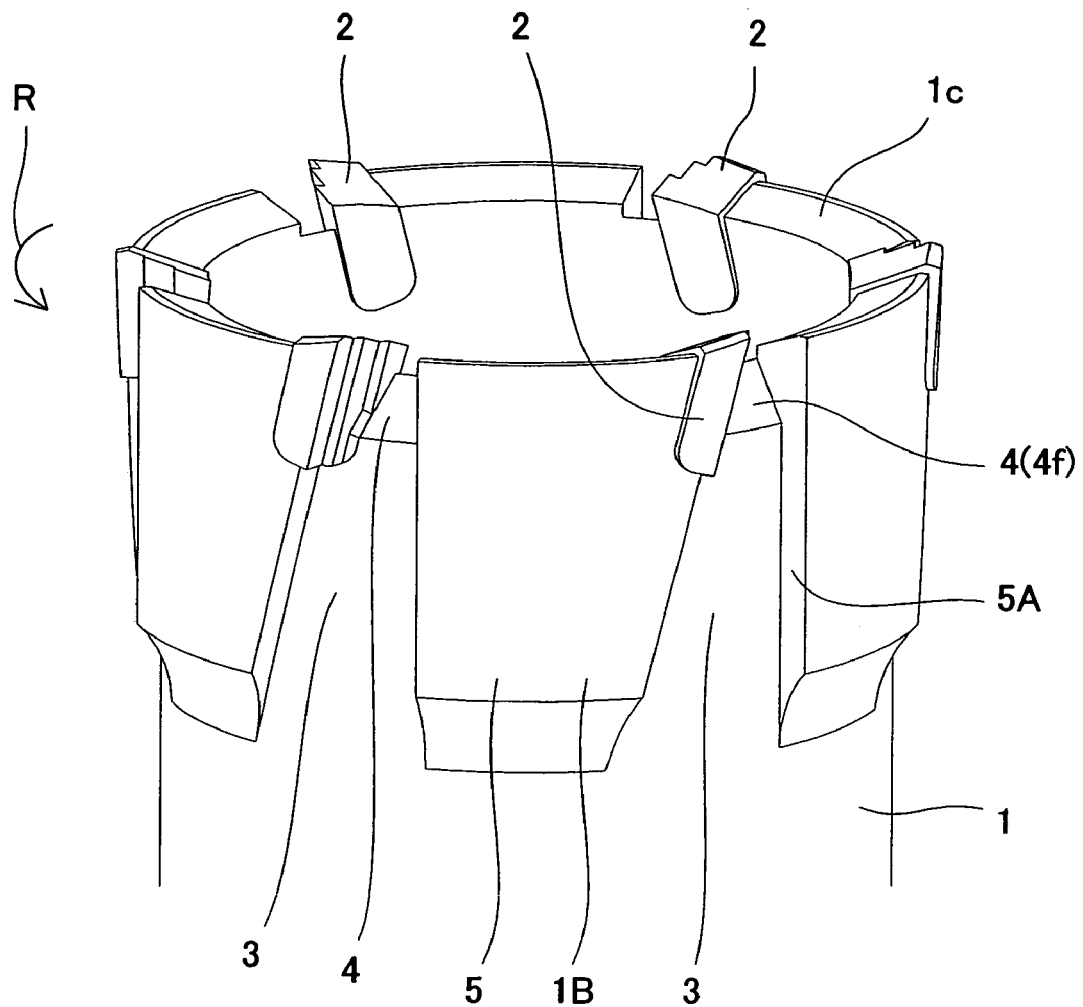
FIG. 2 is a perspective view showing a structure of a tip end portion at which a cutting portion of the core cutter of FIG. 1 is formed, with a tip end oriented upward.
Figure 3:
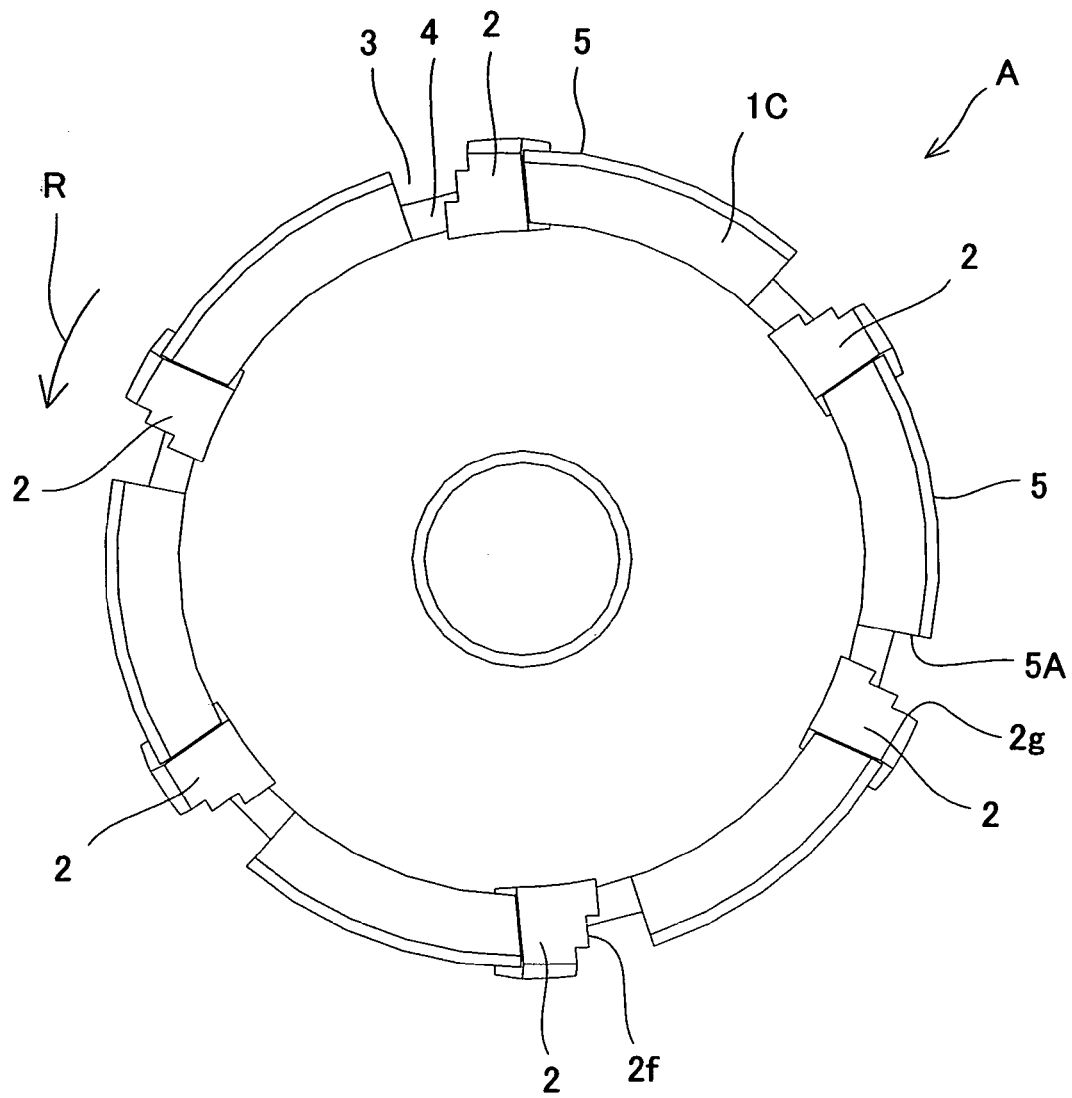
FIG. 3 is a view of the core cutter of FIGS. 1 and 2, as seen from a tip end side.

FIG. 1 is a perspective view showing a construction of an entire core cutter according to an embodiment of the present invention, as seen from a base end side thereof. FIG. 2 is a perspective view showing a structure of a tip end portion of the core cutter of FIG. 1 at which a cutting portion is formed, with a tip end oriented upward. FIG. 3 is a view of the core cutter of FIGS. 1 and 2, as seen from a tip end side As shown in FIG. 1, a core cutter A of this embodiment has an attaching portion 1A on a base end side of a cylindrical base 1 body. The attaching portion 1A is attached to a drive shaft of a rotating tool (not shown). The attaching portion 1A is provided with an attaching concave portion 1a which is partially chamfered. When the attaching portion 1A is attached to a rotating tool (not shown: for example, drilling device), a tip end of a fastener bolt mounted on the rotational tool side to extend toward a center of an attaching shaft is configured to contact the attaching concave portion 1a to allow the core cutter A to be fastened to the rotational tool (not shown). The attaching concave portion 1a may be replaced by fixing means of another configuration, depending on the configuration of an attaching means of the rotational tool.

A plurality of cutting portions 2 are formed at a tip end of the base 1 at suitable intervals in a circumferential direction of the core cutter A (see FIG. 3). In this embodiment, six cutting portions 2 are provided at equal intervals in the circumferential direction.

Figure 9:
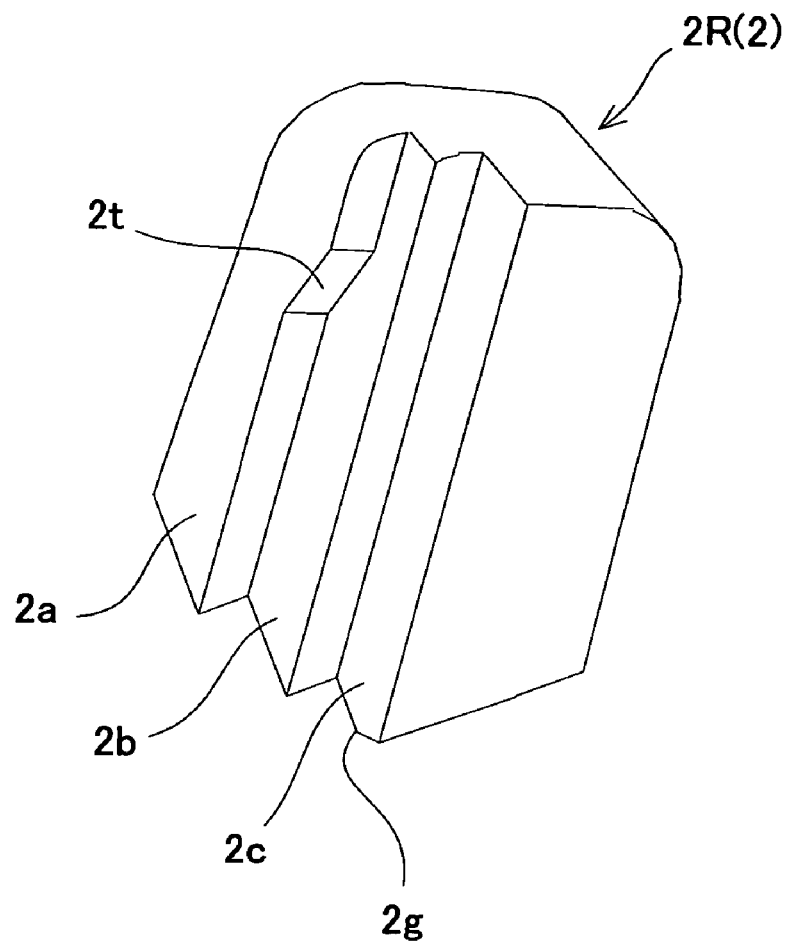
FIG. 9 is a perspective view of a cutting portion of FIG. 8 as obliquely seen from the base end side.

The cutting portion 2 is constructed of a single block 2R (integral block: see FIG. 9). In this embodiment, the cutting portion 2 is formed by sintering cemented carbide. That is, the cutting portion 2 is constructed of the block 2R made of sintered alloy. As a matter of course, the material of the cutting portion 2 is not limited to the cemented carbide, but may be other metals suitably formed into the cutting portion configured for cutting operation. The cutting portion 2 may be manufactured by process other than sintering, for example, casting or machining processes so long as the cutting portion 2 is an integral chip.

Figure 6:
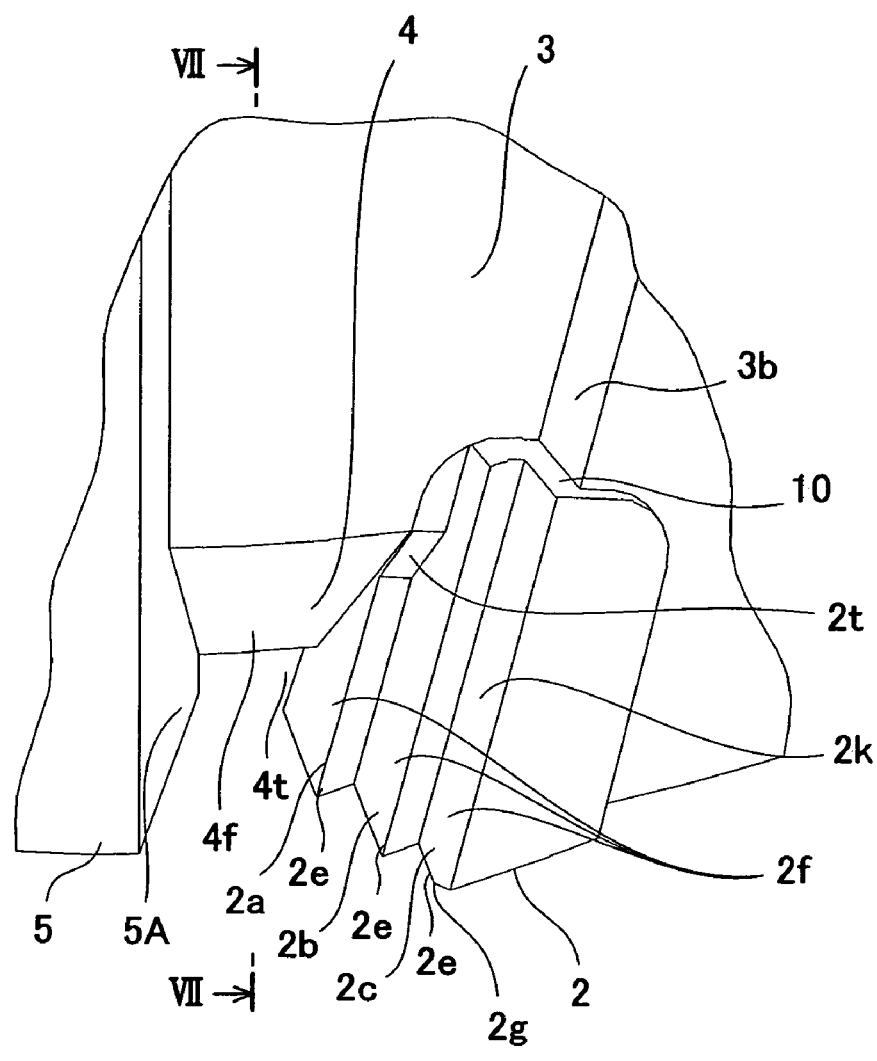
FIG. 6 is a partially enlarged perspective view showing the cutting portion, the gallet, and the discharge groove of FIG. 5.
Figure 7:
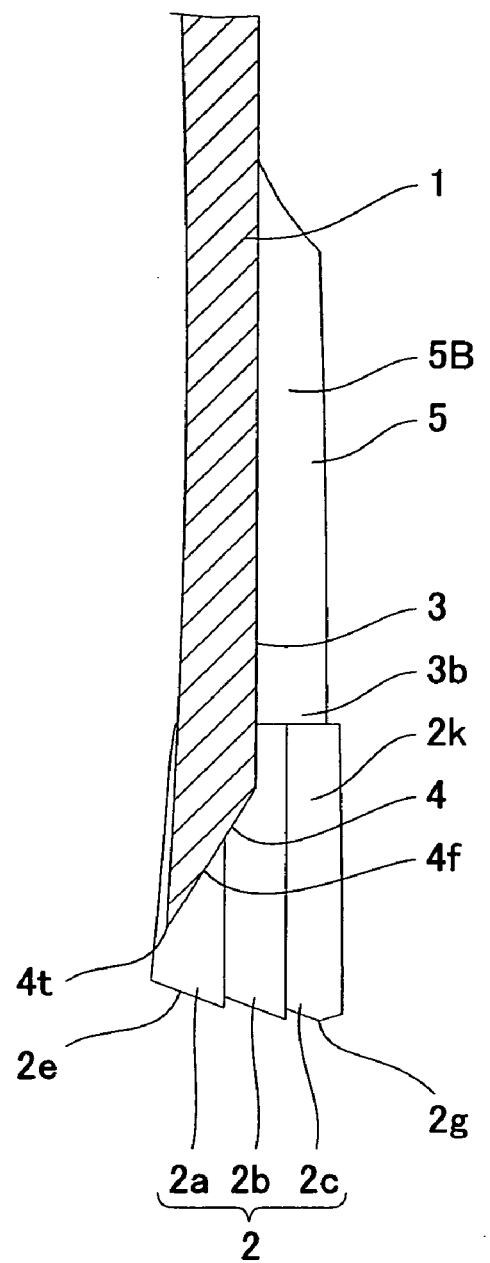
FIG. 7 is a cross-sectional view taken in the direction of arrows substantially along line VII-VII of FIG. 6, showing the gallet and the cutting portion located rearward relative to the gallet in the rotational direction.

The cutting portion 2 has a plurality of cutting blades. In this embodiment, for example, as shown in FIG. 1 and FIGS. 6 and 7, which are enlarged views of the cutting portion 2, the cutting portion 2 has a first cutting blade 2a located radially inward, a third cutting blade 2c located radially outward, and a second cutting blade 2b located between the first and third cutting blades 2a and 2c. Therefore, in this embodiment, as shown in FIG. 9 which is an enlarged view of the cutting portion 2, the cutting portion 2 has three cutting blades 2a, 2b, and 2c.

As shown in FIG. 6, circumferential positions of cutting edges 2e of the respective cutting blades 2a to 2c sequentially deviate rearward (rightward in FIG. 1) with respect to a rotational direction (see arrow R in FIG. 1) in a direction from the first cutting blade 2a to the third cutting blade 2c.

In this embodiment, the first cutting blade 2a has a tilted surface 2t protruding radially outward at a base end portion (upper end portion in FIG. 9) on the second cutting blade 2b side. As can be seen from FIG. 6, the tilted surfaces 2t enables the chips cut by the second cutting blade 2b to be smoothly guided toward a discharge groove 3 described later.

Figure 4:
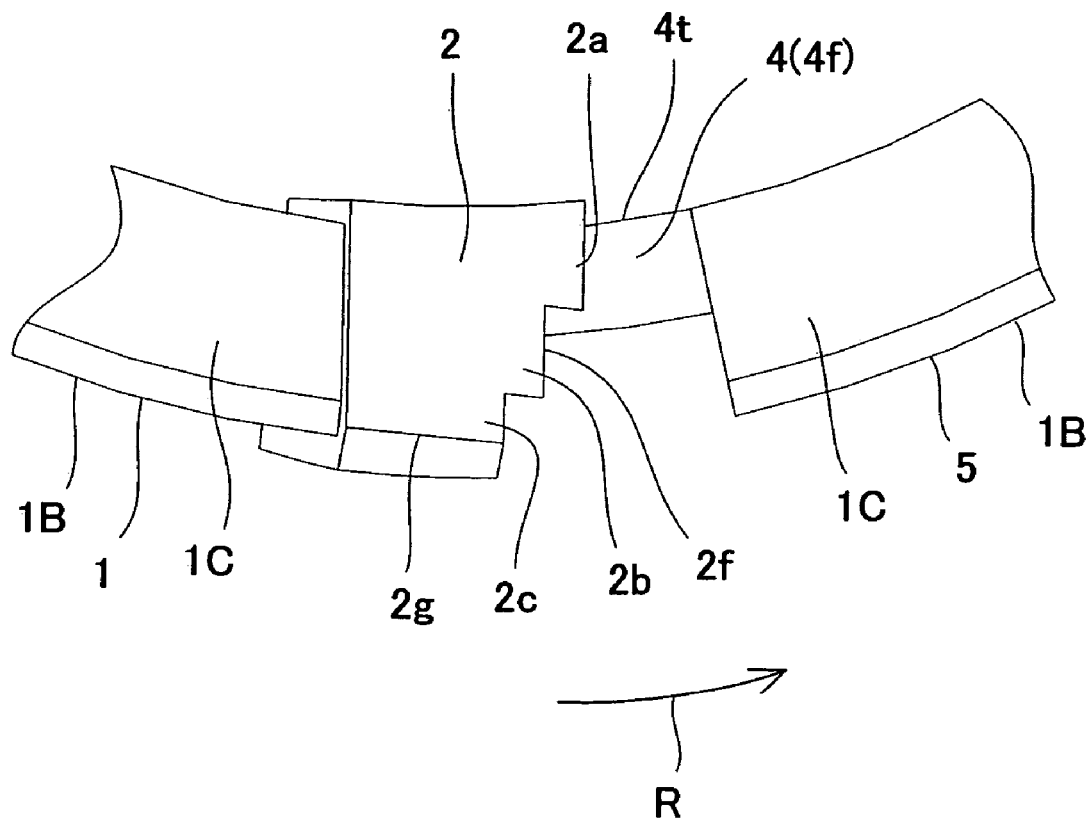
FIG. 4 is a partially enlarged view showing the cutting portion of the core cutter and the gallet shown in FIG. 3.

As shown in FIGS. 4 and 7, in this embodiment, radial dimensions (blade widths) of the first to third cutting blades 2a to 2c are substantially equal. That is, the radial dimensions of the first to third cutting blades 2a to 2c are set so that the widths of the chips cut by the cutting blades 2a to 2c are substantially equal. Alternatively, the width of the first cutting blade 2a may be set larger or smaller than the widths of the second cutting blade 2b and the third cutting blade 2c. Or otherwise, the width of the third cutting blade 2c located to allow the chips to be discharged easily may be larger than the widths of the first cutting blade 2a and the second cutting blade 2b.

As shown in FIG. 1, 2 or 6, the discharge groove 3 is formed adjacent the cutting portion 2 to extend from forward relative to the cutting portion 2 in the rotational direction (see arrow R) toward the base end. As shown in FIG. 6, a wall (rear wall) 3b at a rear end of the discharge groove 3 which is located on a base end side of the cutting portion 2 is located at the same position or rearward in the rotational direction relative to a cutting surface 2k of the third cutting blade 2c. In this embodiment, a tip end (lower end in FIG. 6) of the wall 3b is located slightly rearward in the rotational direction relative to a base end (upper end in FIG. 6) of the cutting surface 2k of the third cutting blade 2c, and a step portion 10 is formed between the cutting surface 2k and the wall 3b.

As shown in FIG. 1, 2, or 6, a gallet 4 is formed continuously with a tip end of each discharge groove 3 and positioned forward of the cutting portion 2. As shown in FIG. 7, an outer peripheral surface 4f forming the gallet 4 is gradually tilted radially inward and downward from a tip end (lower end in FIG. 7) of the discharge groove 3 so as to form a curved surface (see FIGS. 4 and 8). In other words, as can be seen from FIGS. 6 and 8, the gallet 4 is formed by one surface or one curved surface, i.e., part of a conical surface.

As shown in FIG. 4 or 7, a tip end 4t of the gallet 4 substantially conforms to an inner end of the first cutting blade 2a in a radial direction. To be precise, the inner end of the first cutting blade 2a is located slightly inward relative to the tip end 4t of the gallet 4. It is necessary that the tip end 4t of the gallet 4 be located radially inward relative to an outer end of the first cutting blade 2a. In such a construction, most of band-shaped chips which are cut by the first cutting blade 2a are guided to the gallet 4 and are discharged to the groove 3. As a matter of course, most of the chips which are cut by the second cutting blade 2b are guided to the gallet 4 and are discharged to the groove 3. Most of the chips cut by the third cutting blade 2c are directly discharged toward the groove 3 formed at the base end (upper end in FIGS. 6 and 7) of the third cutting blade 2c rather than the gallet 4. The groove 3 and the gallet 4 are formed so as to correspond to each cutting portion 2 and located between adjacent cutting portion forming portions 5 of a plurality of cutting portion forming portions 5 with a large wall thickness which are formed in a part of the base 1 to be spaced apart from each other in the circumferential direction. Therefore, front ends of the gallet 4 and the groove 3 in the rotational direction are adjacent (connected to) a back surface 5A of the cutting portion forming portion 5 located forward in the rotational direction.

The rear wall 3b at the rear end of the discharge groove 3 conforms to a front surface 5B of the cutting portion forming portion 5.

Figure 8:
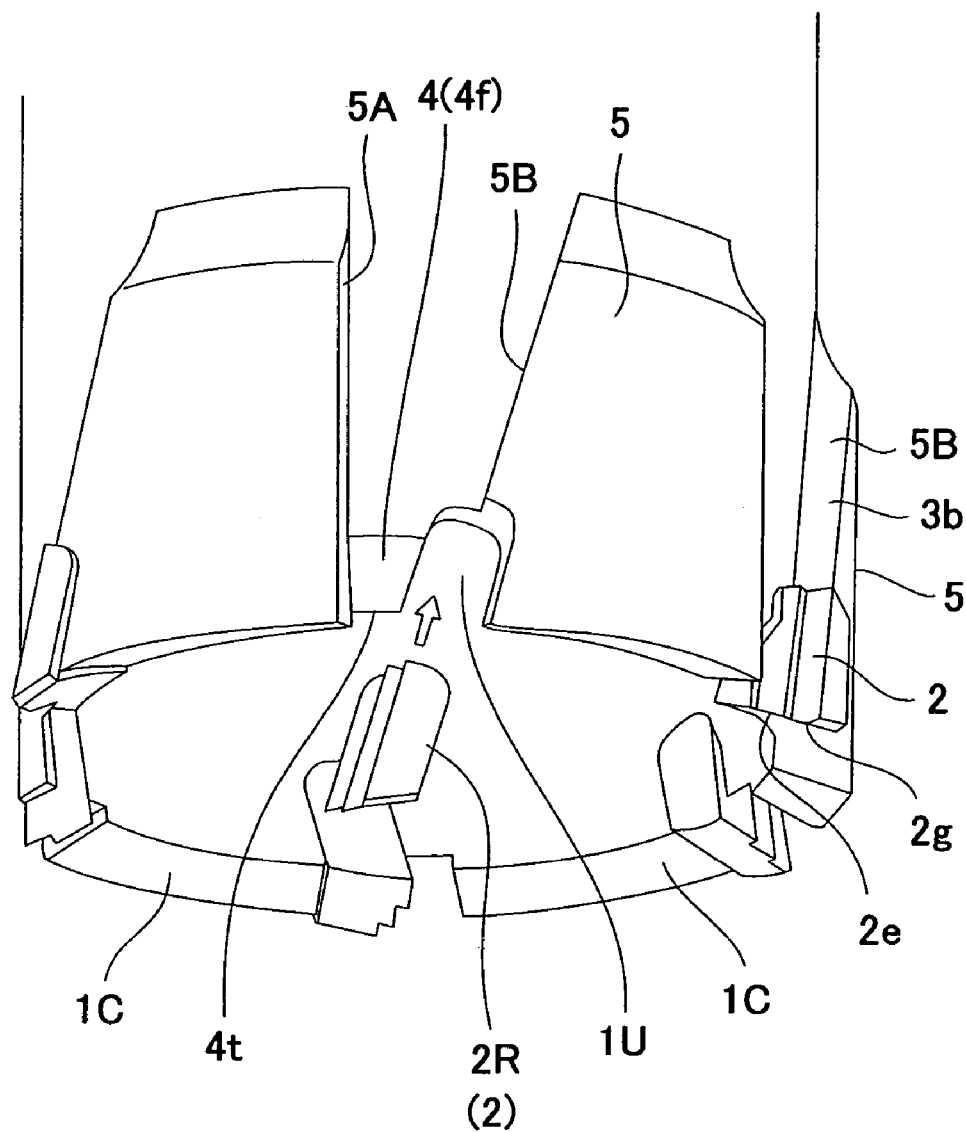
FIG. 8 is a partially enlarged perspective view showing a state before the cutting portion of FIG. 6 is attached.

As shown in an enlarged view of FIG. 8, the block 2R having a radial dimension (width or wall thickness) that is larger than a radial thickness (thickness) of the cutting portion forming portion 5 is implanted in a region of the cutting portion forming portion 5 from a tip end of a front surface 5B to the discharge groove 3, thus forming the cutting portion 2 forward relative to the cutting portion forming portion 5 in the rotational direction. To be specific, as shown in FIG. 8, a concave portion 1U which is of an inverted-U shape and opens at a tip end side is formed on a region of the base 1 from the tip end of the front surface 5B of the cutting portion forming portion 5B to the discharge groove 3. The block 2R of FIG. 9 is implanted in the concave portion 1U by brazing or other methods, thus forming the cutting portion 2 at the tip end of the core cutter A.

As shown in FIG. 4 or 7, with the cutting portion 2 attached to the base 1, the outer end of the cutting portion 2 is located radially outward relative to the outer end of the base 1 (cutting portion forming portion 5) and the inner end of the cutting portion 2 is located radially inward relative to the inner end of the base 1 (cutting portion forming portion 5).

As shown in FIG. 7, a tip end 2g of the cutting portion 2 protrudes to a lowermost position in the vicinity of the outer end. As shown in FIGS. 2 and 7, the cutting portion 2 has tilted surfaces that retreat gradually toward the base end in the direction from the protruding tip end 2g to radially inward side and rearward side in the rotational direction. That is, flank angles (lateral flank angle and rear flank angle) are formed at the tip end.

Figure 5:
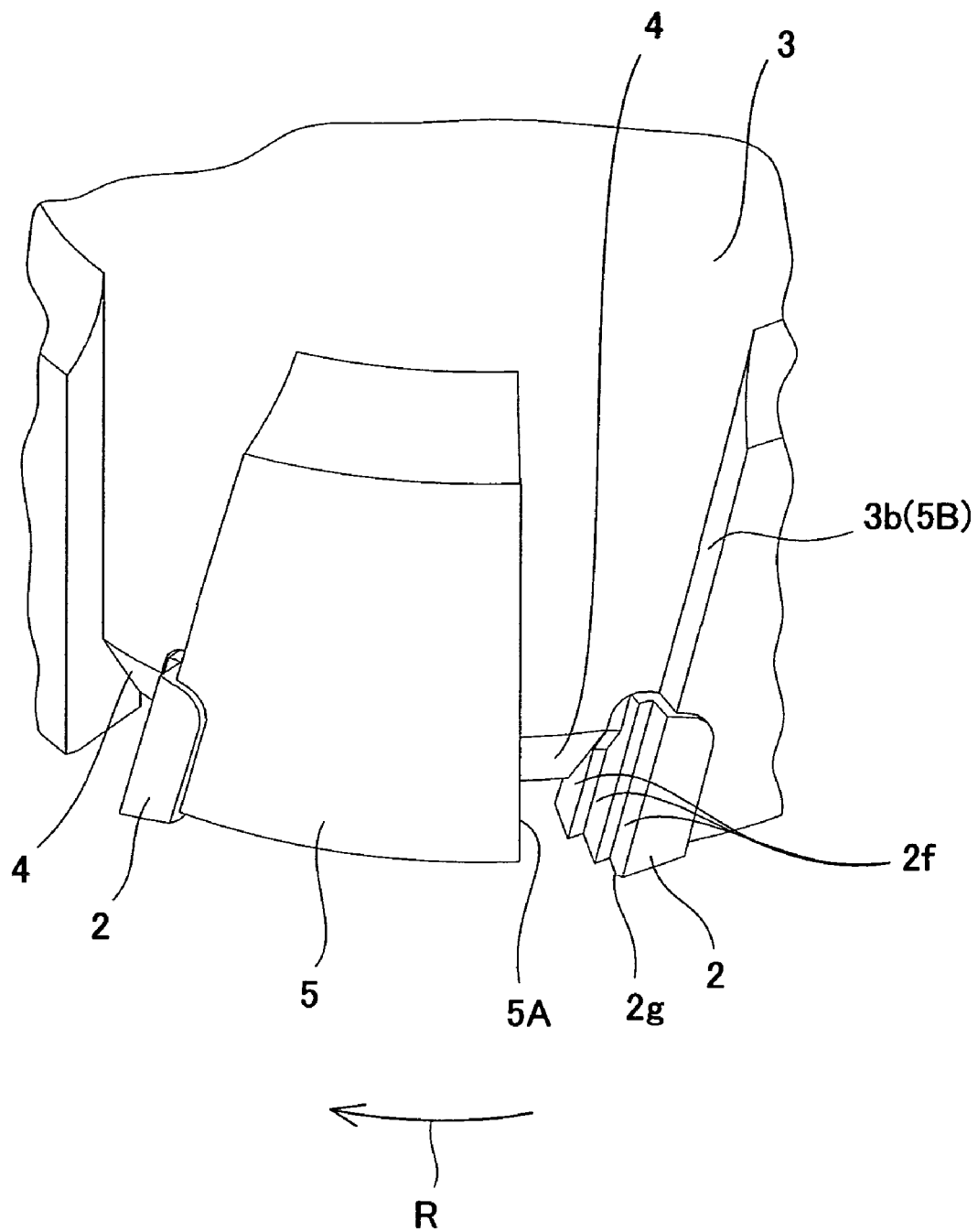
FIG. 5 is a partially enlarged perspective view showing the cutting portion of the core cutter and the gallets formed forward in a rotational direction of the core cutter shown in FIGS. 1 and 2.

As shown in FIGS. 5 and 6, front surfaces (forward surfaces in the rotational direction) 2f of the first to third cutting blades 2a to 2c of the cutting portion 2 are formed by tilted surfaces which have tip ends located forward relative to other regions in the rotational direction and are gradually tilted rearward in the rotational direction toward the base end. Thereby, the front surfaces 2f form cutting surfaces.

As shown in FIG. 6, in this embodiment, the tilting angle of the front surface 2f of the third cutting blade 2c located radially outward relative to the first and second cutting blades 2a and 2b substantially conform to the tilting angle of the wall 3b at the rear end of the groove 3. Alternatively, the tilting angle of the front surface 2f of the third cutting blade 2c may be set to a desired angle depending on the material to be cut, and the tilting angle of the wall 3b may be set to a desired angle for discharging the chips. In other words, the tilting angle of the front surface 2f of the third cutting blade 2c and the tilting angle of the wall 3b may be independently set in order to increase cutting efficiency and to increase discharge efficiency of the chips, respectively.

The core cutter A constructed above provides function and effects as described below.

The blade width of each of the cutting blades 2a to 2c is set independently irrespective of the thickness of the base 1. Therefore, the wall thickness of the base 1 is set according to rigidity demanded by the core cutter. Also, the blade width of each of the cutting blades 2a to 2c is set so as to enable the chips to be discharged most smoothly or to achieve highest cutting efficiency.

The core cutter A is manufactured easily as described below. A cylindrical material (e.g., material made of tool steel) is formed into the cylindrical base 1 and the attaching portion 1A by a rotating tool such as a lathe. A cylindrical wall thickness portion (portions other than the cylindrical wall thickness portion becomes the cutting portion forming portion 5) 1B (see FIG. 2) at the tip end portion of the base 1 is formed by the rotating tool such as the lathe in the process for forming other parts of the base 1. The process for forming other parts of the base 1 includes chamfering process for shaping the tip end surface 1C of the base 1 into a tilted surface. The respective processes are performed to form concentric parts and are carried out easily and in a short time by the lathe or other machines. The chamfering process is performed to form the tip end surface 1C into a tapered surface such that its inner region is tilted toward the base end relative to the outer region.

The cylindrical wall thickness portion 1B located at the tip end portion of the base 1 is provided with grooves extending in the longitudinal direction of the base 1, thereby leaving the cutting portion forming portions 5. The grooves or the attaching concave portion 1a of the attaching portion 1A are formed by using a milling machine, grinding machine, or other machines. The procedure of the process may vary. For example, the attaching concave portion 1a may be formed by the milling machine or the like before the process using the lathe. But, the former procedure is preferable in order to increase process efficiency. Furthermore, the cylindrical wall thickness portions 1B and the grooves between the wall thickness portions 1B may be formed by casting.

The gallet 4 and the concave portion 1U adjacent the gallet 4 may be formed easily by the milling machine or grinding machine. In particular, since the gallet 4 of the core cutter A is formed by one curved surface, it is formed easily and in a short time.

After the concave portions 1U are formed, the integral blocks 2R formed by sintering are fitted to the concave portions 1U by brazing or other process, thus forming the cutting portions 2 at the tip end of the base 1.

The core cutter A manufactured as described above provide function and effects as described below during cutting operation. The respective cutting blades 2a to 2c of each cutting portion 2 at the tip end serve to cut the corresponding regions efficiently. The chips cut by the cutting operation are discharged from the gallet 4, through the discharge groove 3, to outside a protruding hole or directly from the discharge groove 3 to the protruding hole.

Since the cutting portion 2 has the plurality of cutting blades 2a to 2c as described above, the width of the chips becomes small, and as a result, the chips are discharged easily and efficiently.

Embodiment 2

Figure 10:
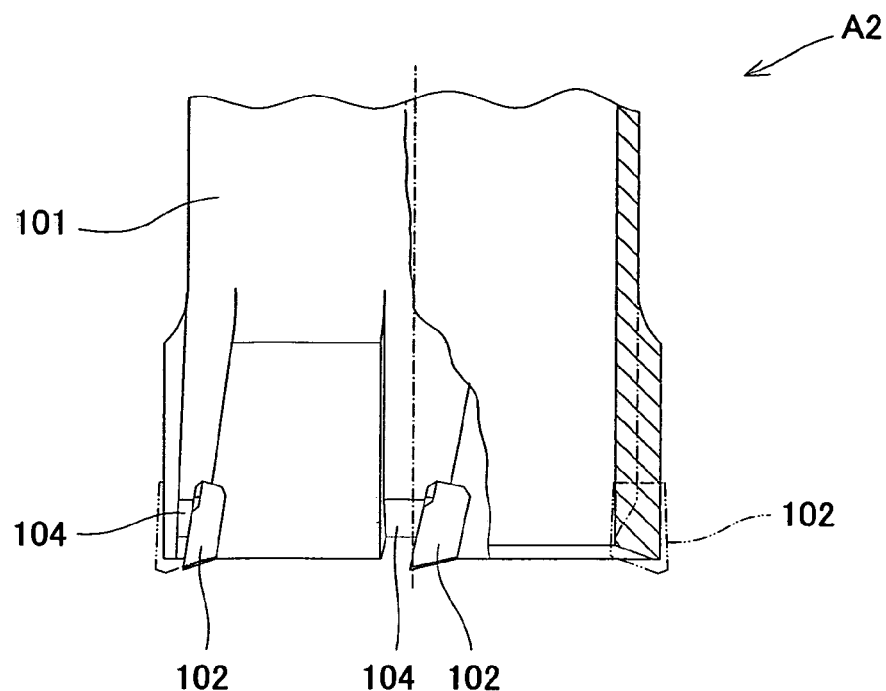
FIG. 10 is a partially enlarged side view showing a tip end portion of the core cutter of another embodiment (embodiment 2), in which core cutter is sectioned in the direction substantially along line X-X of FIG. 11 as indicated by a solid line.

The core cutter A may be replaced by a core cutter A2 constructed as illustrated in FIG. 10. The core cutter A2 of FIG. 10 is different in construction of the cutting portion 2 from the core cutter A of the embodiment 1. Below, the difference between the core cutter A2 and the core cutter A of the embodiment 1 will be described. To be specific, a cutting portion 102 of the second embodiment has a first cutting blade 102a located radially inward, a third cutting blade 102c located radially outward, and a second cutting blade 102b located between the first cutting blade 102a and the third cutting blade 102c in the radial direction, with the cutting portion 102 attached to a base 101.

Figure 11:
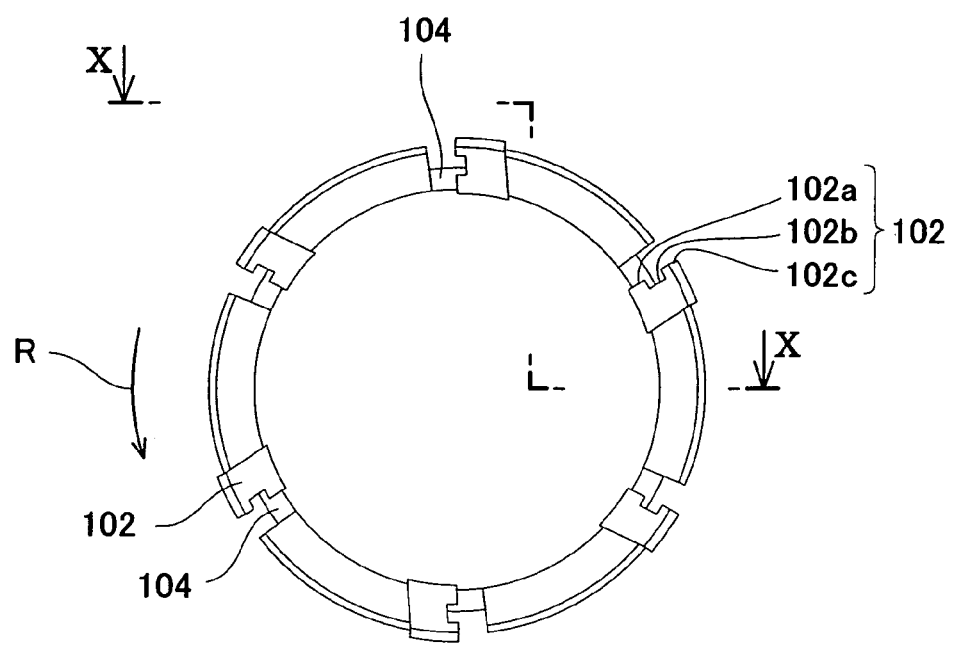
FIG. 11 is a view of the core cutter of FIG. 10, as seen from the tip end side.
Figure 12:
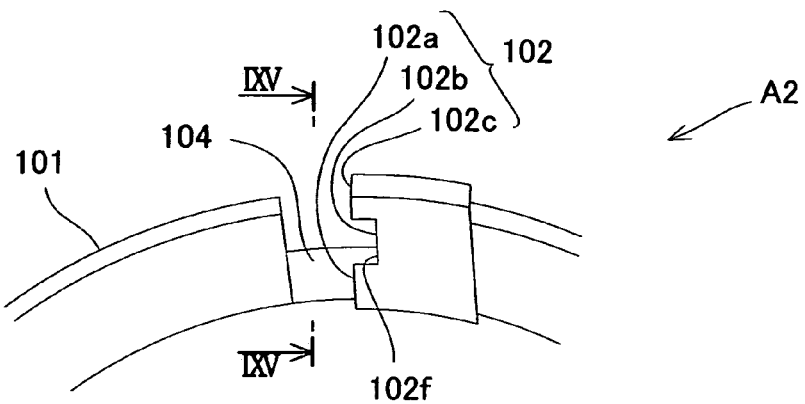
FIG. 12 is a partially enlarged view showing one cutting portion of the core cutter of FIG. 11.
Figure 13:
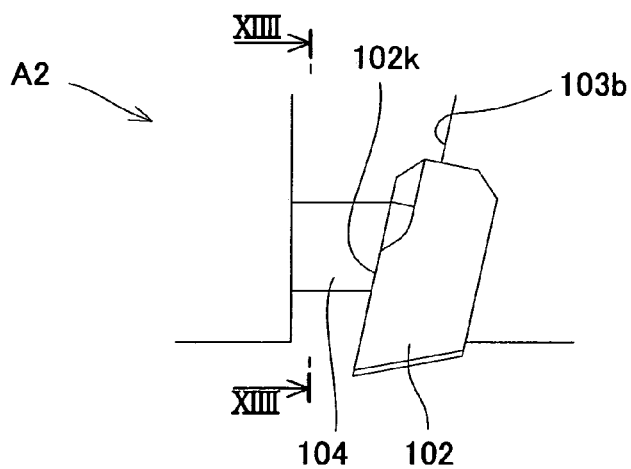
FIG. 13 is a side view of the cutting portion of FIG. 12, as seen from radially outward.
Figure 14:
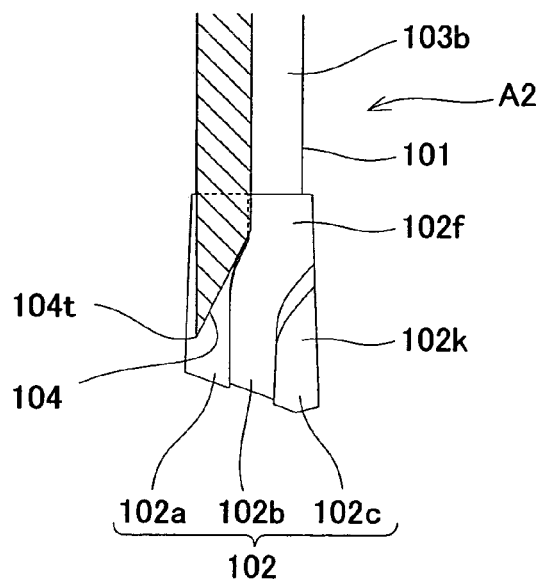
FIG. 14 is a view taken in the direction of arrows substantially along line XIII-XIII of FIG. 13.

As shown in FIGS. 10 to 12, the cutting portion 102 is structured such that the second cutting blade 102b is located rearward relative to the first and third cutting blades 102a and 102c in the rotational direction (see arrow R of FIG. 11), and the first cutting blade 102a and the third cutting blade 102c are located substantially at the same positions forward relative to the second cutting blade 102b in the rotational direction, to be precise, the third cutting blade 102c is located slightly forward relative to the first cutting blade 102a in the rotational direction. The second cutting blade 102b is structured such that a front surface 102f which is the cutting surface is bent radially outward of the core cutter A2 at the base end portion (upper end portion in FIGS. 10, 13, and 14). As shown in FIG. 14, a base end portion of the front surface 102f which is the cutting surface of the second cutting blade 102b is located on the base end side (upper side in FIGS. 10, 13, and 14) of the third cutting blade 102c and is configured to open radially outward so that the chips cut by the front surface 102f are discharged from an upper position (base end side) of the third cutting blade 102c radially outward and upward of the cutter 2A.

As shown in FIG. 14, a tip end portion of the third cutting blade 102c is shaped such that its center protrudes to a lowermost position and the other regions on both sides gradually recede. The second cutting blade 102b and the first cutting blade 102a are tilted substantially at the same tilting angle as a tilted surface of the third cutting blade 102c which is located radially inward. The wall 103b of the rear end of the discharge groove corresponding to the third cutting blade 102c is located at the same position or rearward in the rotational direction relative to the cutting surface 102k of the third cutting blade 102c. The outer end of the first cutting blade 102a of the cutting portion 2 is located radially inward relative to a tip end (outer end) 104t of the gallet 104.

In the embodiment 2, the first cutting blade 102a, the second cutting blade 102b, and the third cutting blade 102c have a substantially equal width. In other construction, the core cutter A2 is identical to the core cutter A of the embodiment 1.

The core cutter A2 thus constructed is capable of maintaining the circumferential dimension of the cutting portion 2 even when the position of the second cutting blade 102b relative to the first and third cutting blades 102a and 102c varies, in addition to providing the function and effects of the core cutter A of the embodiment 1. Therefore, the same base 1 is used even when the construction of the cutting blade 102 varies. As a result, a mass production is realized.

Embodiment 3

Figure 15:
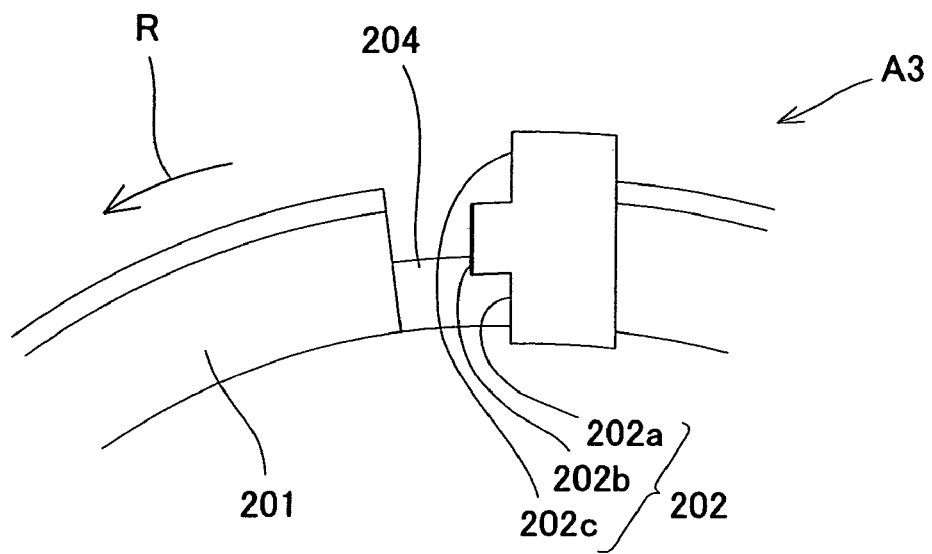
FIG. 15 is partially enlarged view showing a structure of a cutting portion of a core cutter of another embodiment (embodiment 3), as seen from the tip end side.

The core cutters A1 and A2 of the embodiments 1 and 2 may be replaced by a core cutter A3 shown in FIG. 15. The core cutter A3 of FIG. 15 is different in construction of a cutting portion 202 from the cutters A1 and A2 of the embodiments 1 and 2. Below, the difference between the core cutter A3 and the core cutter A of the embodiment 1 will be described. The cutting portion 202 of the embodiment 3 has a first cutting blade 202a located radially inward, a third cutting blade 202c located radially outward, and a second cutting blade 202b located between the first cutting blade 202a and the third cutting blade 202c in the radial direction.

As shown in FIG. 15, the cutting portion 202 is structured such that the second cutting blade 202b is located forward relative to the first cutting blade 202a and the third cutting blade 202c in the rotational direction (see arrow R of FIG. 15), and the first and third cutting blades 202a and 202c are located substantially at the same positions rearward relative to the second cutting blade 202b in the rotational direction. In other construction, the core cutter A3 is identical to the core cutter A of the embodiment 1.

The core cutter A3 thus constructed is capable of maintaining the circumferential dimension of the cutting portion 202 even when the positions of the first and third cutting blades 202a and 202c relative to the second cutting blade 202b varies, in addition to providing the function and effects of the core cutter A of the embodiment 1. Therefore, the same base 1 is used even when the construction of the cutting blade 102 varies. As a result, a mass production is realized. In FIG. 15, 204 denotes a gallet.

Embodiment 4

Figure 16:
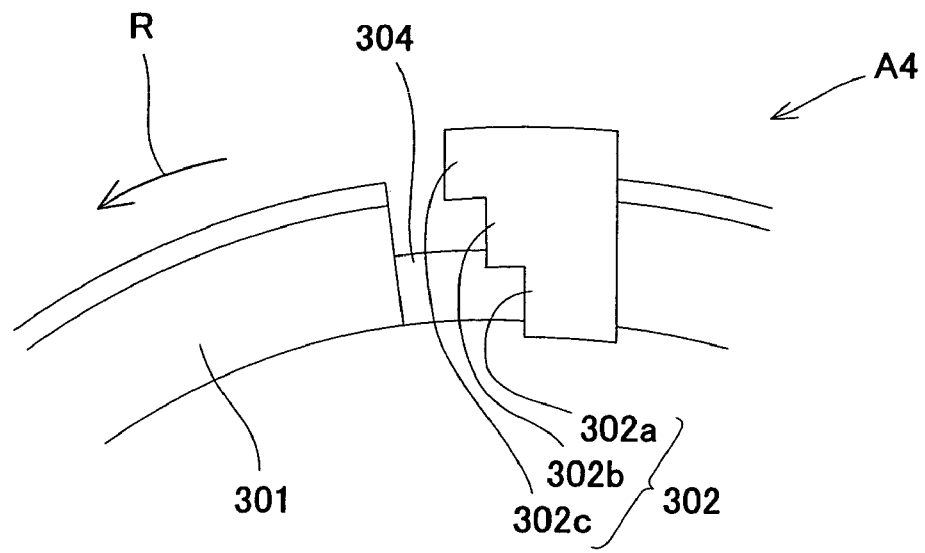
FIG. 16 is a partially enlarged view showing a structure of a cutting portion of a core cutter of another embodiment (embodiment 4), as seen from the tip end side.

The constructions of the core cutters A, A2 and A3 of the embodiments 1 to 3 may be replaced by a construction of a core cutter A4 illustrated in FIG. 16. The core cutter A4 of FIG. 16 is different in construction of a cutting portion 302 from those of the embodiments 1 to 3. Below, the difference between the core cutter A4 and the core cutter A of the embodiment 1 will be described. To be specific, the cutting portion 302 of the embodiment 4 has a first cutting blade 302a located radially inward, a third cutting blade 302c located radially outward, and a second cutting blade 302b located between the first and third cutting blades 302a and 302c in the radial direction.

As shown in FIG. 16, the cutting portion 302 is structured such that the third cutting blade 302c, the second cutting blade 302b and the first cutting blade 302a are arranged in this order from forward in the rotational direction (see arrow R in FIG. 15). In other configurations, the core cutter A4 is identical to the core cutter A of the embodiment 1.

Since the core cutter A4 thus constructed allows the circumferential dimension of the third cutting blade 302c located radially outward to increase, in addition to provide the function and effects of the core cutter A of the embodiment 1, the third cutting blade 302c is less likely to break. In FIG. 16, 304 denotes a gallet.

INDUSTRIAL APPLICABILITY

The present invention is applicable to core cutters suitable for drilling holes in materials such as metal, resin material, polymer material, stone, cement, and wood.

The invention claimed is:

1. A core cutter comprising:
a cylindrical base provided with a plurality of radially thickened cutting portion forming portions spaced apart from one another in a circumferential direction, the cutting portion forming portions formed only adjacent a tip end portion in an axial direction of the base, the thickened cutting portion forming portions protruding radially outward from an outer peripheral surface of the base, each cutting portion forming portion having a front surface and a back surface;
an attaching portion that is provided on a base end side of the base to be attachable to a rotation drive tool;
a plurality of cutting portions provided at a tip end of the base to be spaced apart from each other in a circumferential direction of the base in such a manner that outer peripheries of the cutting portions protrude radially outward relative to an outer periphery of the base; and
discharge grooves each of which is provided between the back surface of each cutting portion forming portion and the front surface of the next adjacent cutting portion forming portion in a rotationally rearward direction, the discharge grooves being provided only in the tip end portion of the cylindrical base and being configured to discharge chips cut by the cutting portions toward the base end of the base;
wherein each of the cutting portions is constructed of an integral block separate from the base and securable to the base, each cutting portion having at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade is located between the first and third cutting blades in a radial direction of the base, wherein the first, second, and third cutting blades are arranged such that their circumferential positions deviate rearward in this order in a rotational direction of the core cutter;
wherein a wall of a rear end of the discharge groove provided to correspond to the third cutting blade is located at the same position or rearward in the rotational direction relative to a cutting surface of the third cutting blade; and
wherein a gallet for discharging chips cut by each cutting portion is provided adjacent each cutting portion to be located forward relative to each cutting portion in the rotational direction, the gallet being formed by a single curved surface, the single curved surface formed from part of a conical surface, the single curved surface formed by cutting an outer peripheral surface of a tip end portion of the base in such a manner that an inner end of the gallet is located radially inward relative to an outer end of the first cutting portion and protrudes to a lower position than an outer end of the gallet, and wherein a tip end of the gallet extends horizontally relative to a vertical axis of the cylindrical base.

2. A core cutter comprising:
a cylindrical base, the cylindrical base having a plurality of radially thickened cutting portion forming portions spaced apart from one another in a circumferential direction, the thickened cutting portion forming portions formed only adjacent an axial tip end portion of the base, the thickened cutting portion forming portions protruding radially outward from an outer peripheral surface of the base, each cutting portion forming portion having a front surface and a back surface;
an attaching portion that is provided on a base end side of the base to be attachable to a rotation drive tool;
a plurality of cutting portions provided at a tip end of the base to be spaced apart from each other in a circumferential direction of the base in such a manner that outer peripheries of the cutting portions protrude radially outward relative to an outer periphery of the base; and
discharge grooves each of which is provided between the back surface of each cutting portion forming portion and the front surface of the next adjacent cutting portion forming portion in a rotationally rearward direction, the discharge grooves being provided only in the tip end portion of the cylindrical base and being configured to discharge chips cut by the cutting portions toward the base end of the base;
wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base such that the second cutting blade is located rearward in the rotational direction relative to the first and third cutting blades in a circumferential direction of the base and the first and third cutting blades are located adjacent the second cutting blade and forward relative to the second cutting blade in the rotational direction;
wherein a wall of a rear end of the discharge groove provided to correspond to the third cutting blade is located at the same position or rearward in the rotational direction relative to a cutting surface of the third cutting blade; and
wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet.

3. A core cutter comprising:
a cylindrical base, the cylindrical base having a plurality of radially thickened cutting portion forming portions spaced apart from one another in a circumferential direction, the thickened cutting portion forming portions formed only adjacent an axial tip end portion of the base, the thickened cutting portion forming portions protruding radially outward from an outer peripheral surface of the base, each cutting portion forming portion having a front surface and a back surface;
an attaching portion that is provided on a base end side of the base to be attachable to a rotation drive tool;
a plurality of cutting portions provided at a tip end of the base to be spaced apart from each other in a circumferential direction of the base in such a manner that outer peripheries of the cutting portions protrude radially outward relative to an outer periphery of the base; and
discharge grooves each of which is provided between the back surface of each cutting portion forming portion and the front surface of the next adjacent cutting portion forming portion in a rotationally rearward direction, the discharge grooves being provided only in the tip end portion of the cylindrical base and being configured to discharge chips cut by the cutting portions toward the base end of the base;
wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base such that the second cutting blade is located rearward in the rotational direction relative to the first and third cutting blades in a circumferential direction of the base and the first and third cutting blades are located adjacent the second cutting blade and forward relative to the second cutting blade in the rotational direction;
wherein a wall of a rear end of the discharge groove provided to correspond to the third cutting blade is located at the same position or rearward in the rotational direction relative to a cutting surface of the third cutting blade;
wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet; and
wherein a cutting surface of the second cutting blade is bent at an upper end thereof radially outward of the cutter.

4. The core cutter according to claim 2, wherein an upper end portion of a cutting surface of the second cutting blade is located adjacent an upper end side of the third cutting blade, and the chips cut by the second cutting blade are discharged radially outward from a position on the upper end side of the third cutting blade.

5. A core cutter comprising:
a cylindrical base, the base having a base end and a tip end opposite the base end, the base further having a plurality of radially thickened cutting portion forming portions spaced apart from one another in a circumferential direction, the thickened cutting portion forming portions formed only adjacent an axial tip end portion of the base, the thickened cutting portion forming portions protruding radially outward from an outer peripheral surface of the base, each cutting portion forming portion having a front surface and a back surface;
an attaching portion that is provided on the base end of the base to be attachable to a rotation drive tool;
a plurality of cutting portions provided at a tip end of the base to be spaced apart from each other in a circumferential direction of the base in such a manner that outer peripheries of the cutting portions protrude radially outward relative to an outer periphery of the base; and
discharge grooves each of which is provided between the back surface of each cutting portion forming portion and the front surface of the next adjacent cutting portion forming portion in a rotationally rearward direction, the discharge grooves being provided only in the tip end portion of the cylindrical base and being configured to discharge chips cut by the cutting portions toward the base end of the base;
wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base such that the second cutting blade is located forward in the rotational direction relative to the first and third cutting blades in a circumferential direction of the base and the first and third cutting blades are located rearward in the rotational direction relative to the second cutting blade in the circumferential direction;
wherein a wall of a rear end of the discharge groove provided to correspond to the third cutting blade is located at the same position or rearward in the rotational direction relative to a cutting surface of the third cutting blade; and
wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position than an outer end of the gallet.

6. A core cutter comprising:
a cylindrical base, the base having a base end and a tip end opposite the base end, the base further having a plurality of radially thickened cutting portion forming portions spaced apart from one another in a circumferential direction, the thickened cutting portion forming portions formed only adjacent an axial tip end portion of the base, the thickened cutting portion forming portions protruding radially outward from an outer peripheral surface of the base, each cutting portion forming portion having a front surface and a back surface;

an attaching portion that is provided on a base end side of the base to be attachable to a rotation drive tool;

a plurality of cutting portions provided at a tip end of the base to be spaced apart from each other in a circumferential direction of the base in such a manner that outer peripheries of the cutting portions protrude radially outward relative to an outer periphery of the base; and discharge grooves each of which is provided between the back surface of each cutting portion forming portion and the front surface of the next adjacent cutting portion forming portion in a rotationally rearward direction, the discharge grooves being provided only in the tip end portion of the cylindrical base and being configured to discharge chips cut by the cutting portions toward the base end of the base;

wherein each of the cutting portions is constructed of a block and has at least three cutting blades including a first cutting blade, a second cutting blade, and a third cutting blade which are arranged radially adjacent each other with the cutting portions attached to the base, the first cutting blade being located radially inward relative to the second and third cutting blades and the second cutting blade being located between the first and third cutting blades in a radial direction of the base, wherein the third cutting blade precedes the second cutting blade, and second cutting blade precedes the first cutting blade in a rotational direction of the core cutter;

wherein a wall of a rear end of the discharge groove provided to correspond to the third cutting blade is located at the same position or rearward in the rotational direction relative to a cutting surface of the third cutting blade; and wherein a gallet for discharging chips cut by each cutting portion is provided adjacent each cutting portion to be located forward relative to each cutting portion in the rotational direction, the gallet being formed by one surface which is formed by cutting an outer peripheral surface of a tip end portion of the base in such a manner that an inner end of the gallet is located radially inward relative to an outer end of the first cutting portion and protrudes to a lower position an the outer end of the gallet.

7. The core cutter according to claim 1, wherein an outer peripheral surface of the gallet is tilted radially inward and downward at a tip end side of the base and is formed to have a tip end substantially conforming to an inner end of the first cutting blade in the radial direction so as to form a curved surface.

8. The core cutter according to claim 1, wherein a blade width of each of the first, second, and third cutting blades is set independently of a thickness of the base.

9. The core cutter according to claim 1, wherein a tilting angle in the rotational direction of the wall of the rear end of the discharge groove provided on the base end side of the third cutting blade is set independently of a cutting angle of a cutting surface of the third cutting blade.

10. The core cutter according to claim 1, wherein the cutting portions are made of a cemented carbide material.

11. The core cutter according to claim 5, wherein an outer peripheral surface of the gallet is tilted radially inward and downward at a tip end side of the base and is formed to have a tip end substantially conforming to an inner end of the first cutting blade in the radial direction so as to form a curved surface.

12. The core cutter according to claim 6, wherein an outer peripheral surface of the gallet is tilted radially inward and downward at a tip end side of the base and is formed to have a tip end substantially conforming to an inner end of the first cutting blade in the radial direction so as to form a curved surface.

13. The core cutter according to claim 5, wherein a blade width of each of the first to third cutting blades is set independently of a thickness of a base.

14. The core cutter according to claim 6, wherein a blade width of each of the first to third cutting blades is set independently of a thickness of a base.

15. The core cutter according to claim 2, wherein a tilting angle in the rotational direction of the wall of the rear end of the discharge groove provided on the base end side of the third cutting blade is set independently of a cutting angle of a cutting surface of the third cutting blade.

16. The core cutter according to claim 5, wherein a tilting angle in the rotational direction of the wall of the rear end of the discharge groove provided on the base end side of the third cutting blade is set independently of a cutting angle of a cutting surface of the third cutting blade.

17. The core cutter according to claim 6, wherein a tilting angle in the rotational direction of the wall of the rear end of the discharge groove provided on the base end side of the third cutting blade is set independently of a cutting angle of a cutting surface of the third cutting blade.

18. The core cutter according to claim 2, wherein the cutting portions are made of a cemented carbide material.

19. The core cutter according to claim 5, wherein the cutting portions are made of a cemented carbide material.

20. The core cutter according to claim 6, wherein the cutting portions are made of a cemented carbide material.

* * * * *